June 28, 1966 D. CARLSON ET AL 3,258,760

FLOW INDICATOR

Filed Feb. 12, 1964

INVENTORS
DAVID CARLSON
ELMO E. MOYER
JOHN W. PIKE

BY

Kane, Dalsimer and Kane
ATTORNEYS

United States Patent Office 3,258,760 Patented June 28, 1966

3,258,760
FLOW INDICATOR

David Carlson and John W. Pike, Woodstock, and Elmo E. Moyer, Saratoga Springs, N.Y., assignors to Rotron Manufacturing Company, Inc., Woodstock, N.Y., a corporation of New York Filed Feb. 12, 1964, Ser. No. 344,322
5 Claims. (Cl. 340—239)

This invention relates to indicators generally and more particularly to a printed circuit card having glow means thereon to provide a visual indication of the presence or absence of a flow of cooling air around the unit.

In the electrical art today, and particularly in the computer and control fields, it is customary to provide circuitry in the form of printed cards mounted in rack formation within a limited amount of space. In such an installation cooling air is generally forced through the rack in various paths to cool the components and/or to maintain, within limits, a predetermined ambient temperature within the unit.

In the application of cooling air through a rack it is often desirable and/or necessary to have an indication under actual operating conditions of the effectiveness of cooling air within the unit.

It is a principal object of this invention to provide a means for permanent, semipermanent or test installation within a circuit with which a visual indication of the presence or absence of cooling air can be had.

It is a further object to provide such an indicator which can be utilized in connection with auxiliary equipment to provide a continual indication of the effectiveness of cooling air by means in addition to visual means.

Figure 1:
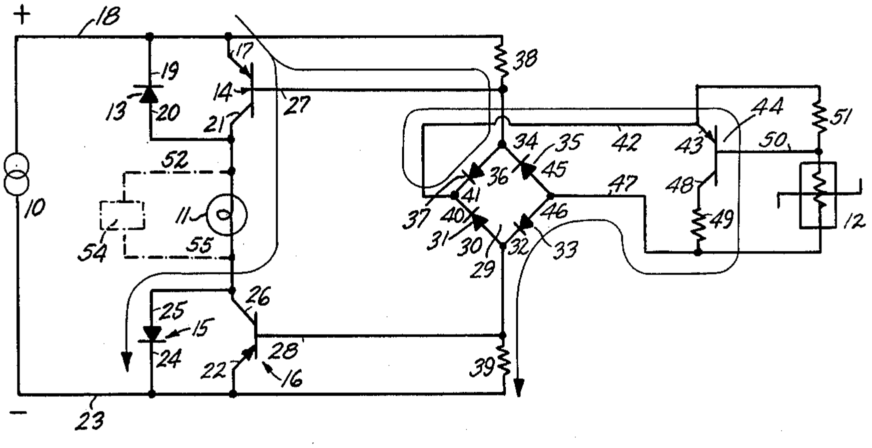
Figure 2:
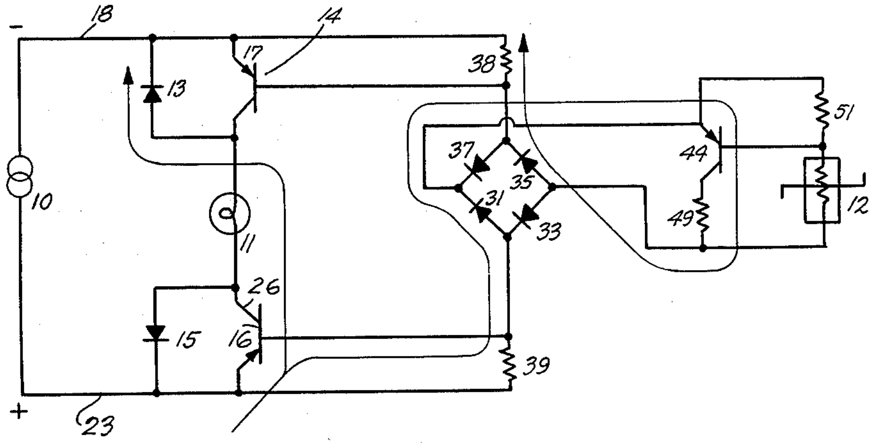

A glow card indicator constructed in accordance with the teachings of this invention is described herein in connection with the drawings, in which:

FIG. 1 is a schematic diagram of the circuit of the glow card indicator constructed in accordance with the teachings of this invention in which arrows are provided indicating the direction of current flow during one-half cycle of operation; and FIG. 2 is the schematic circuit of FIG. 1 in which arrows are provided indicating the direction of current flow during the next half-cycle operation.

In the figures, the numeral 10 indicates a source of alternating current, for example 12 volts 60 cycle current. The numeral 11 indicates a small lamp whose light intensity can decrease when cooling air is blown across the end of its glass bulb enclosure. The numeral 12 indicates a thermistor element whose resistance changes very markedly with change in temperature. The thermistor and the bulb, together with the other components of the circuit shown in FIG. 1, are placed on a printed card with the thermistor placed adjacent to bulb 11 in order to sense heat radiated and convected from bulb 11. A diode 13 and PNP transistor 14 are placed in parallel as are rectifier 15 and transistor 16. The parallel combination of rectifier 13 and transistor 14 are placed in series with the lamp 11 and the parallel combination of diode 15 and transistor 16 which is also a PNP transistor. As shown in the figures, emitter 17 of transistor 14 is connected to lead 18 which, in turn, is connected to one side of voltage source 10 and what will be referred to herein as the cathode of semiconductor diode 13 is connected to the lead 18 and designated by the numeral 19. The remaining side of the diode 13 which will be referred to as the anode 20, is connected to collector 21 of transistor 14 and one side of the lamp is also connected to collector 21. The emitter 22 of transistor 16 is connected to lead 23 which is connected to the remaining side of source 10 and cathode 24 of diode 15 is also connected to lead 23. The anode 25 of diode 15 and collector 26 of transistor 16 are connected to the remaining side of lamp 11. Base 27 of transistor 14 and base 28 of transistor 16 are connected to bridge circuit 29 with base 28 being connected to the anode 30 of semiconductor diode 31 and cathode 32 of semiconductor diode 33. Base 27 is connected to cathode 34 of semiconductor diode 35 and anode 36 of semiconductor diode 37. The base 27 is separated from lead 18 by resistance 38 and base 28 is separated from lead 23 by resistance 39.

The cathode 40 of diode 31 and cathode 41 of diode 37 are connected to lead 42 which is connected to the emitter 43 of transistor 44. The anode 45 of diode 35 and the anode 46 of diode 33 are connected to lead 47 which is connected to the collector 48 of transistor 44 through resistor 49. Lead 47 is also connected to one side of thermistor 12 and the base 50 of transistor 44 is connected to the other side of thermistor 12 with the base 50 being separated from lead 42 by resistor 51.

In FIG. 1 the arrows show the flow of current in a circuit in the portion of the cycle that lead 18 is positive with respect to lead 23. During this half-cycle, transistor 14 is conducting and the flow of current is from lead 18 through emitter 17, collector 21, lamp 11 and the diode 15. The amount of current through lamp 11 is dependent upon the base current drawn which is determined in the circuit by the conducting condition of transistor 44, since the base current of transistor 14 follows the path through diode 37, emitter 43 of transistor 44, collector 48 of transistor 44, resistor 49, diode 33 and resistor 39 to lead 23. It is noted that the thermistor 12 is in the circuit of the base of transistor 44.

In the second half-cycle, which is represented in FIG. 2, the transistor 14 is no longer conducting but rather transistor 16 and current flow is through transistor 16 to collector 26, lamp 11 and diode 13 to lead 18. Once again, the intensity of current passing through lamp 11 is determined by the conducting condition of transistor 44 since the base current circuit of transistor 16 is through diode 31, transistor 44, resistor 49, diode 35 and resistance 38, to lead 18.

Since the thermistor and lamp are placed adjacent to one another, the circuit will start up of its own accord due to the current through the thermistor warming it sufficiently to initiate lamp current and heat by which operation is furthered. The thermistor element and the lamp will reach a state of equilibrium which state will be determined by the resistance of thermistor 12 which, in turn, is determined by the effectiveness of the cooling air. The intensity of brightness of lamp 11 will depend upon the amount of current flowing therethrough and this current is determined by the resistance of the variable resistance component, the thermistor 12. A change in air flow will result in a change in the amount of heat from lamp 11 which is sensed by thermistor 12. This then changes the balance and changes the current flow through transistor 44, thereby changing the current flow in the conducting transistor 14 or 16. As an example, considering the conditions of FIG. 1, when transistor 14 is conducting, the changing of the value of the thermistor so that it decreases in resistance in an assumed condition where the air flow fails and thet hermistor becomes warmer this decreases in resistance of the thermistor results in brightening of the bulb since it causes more base current to be drawn in transistor 44 giving an increase in base current in transistor 14 resulting in more collector current in transistor 14 which flows through the bulb brightening it. Of course, this condition exists during the second half cycle as shown in FIG. 2.

As stated heretofore, the circuit together with lamp 11 and the thermistor 12 can be placed on a printed circuit card and inserted in the rack in an electronic enclosure. When cooling air is blown between the lamp and the thermistor, the thermistor receives less heat from the lamp, the resistance of the thermistor increase. This actuates the transistor circuit to reduce the current through the lamp until a new equilibrium is established and a lower lamp intensity. The opposite occurs when the cooling air is removed, giving greater lamp intensity.

If desired, a continual indication can be obtained, or an indication can be obtained which will actuate an alarm or other device by the placing of leads 52 and 53 which are shown in phantom in FIG. 1 across lamp 11 to activate an alarm 54 which is also shown in phantom.

It is also within the scope of the invention for one with the skill of the art to modify the circuitry disclosed herein to substitute for the various components other components such as NPN' transistors or vacuum tube devices.

Thus, among others, the several objects in the invention, as specifically aforenoted, are achieved. Obviously, numerous changes in construction and rearrangement of parts may be resorted to without departing from the spirit of the invention as defined by the claims.

Having thus described our invention, we claim:

1. An indicator to indicate the presence of a flow of cooling air including in combination a lamp bulb, a heat sensitive element spaced therefrom within the influence of heat radiated and convected from said bulb so that cooling air can flow between said heat sensitive element and said bulb, an electronic circuit, said bulb and the impedance of said heat sensitive element being parameters thereof, said circuit further including means responsive to the alteration in the amount of cooling air flowing and to the alteration in the amount of heat radiated and convected to said heat sensitive element to alter the current through the bulb.

2. An indicator to indicate the presence of a flow of cooling air in accordance with claim 1 in which the heat sensitive element is a thermistor whose resistance increases in the absence of cooling air increasing the lamp intensity.

3. An indicator to indicate the presence of a flow of cooling air in accordance with claim 1 in which a transistor is in series circuit with said lamp bulb and the heat sensitive device is a thermistor in the base circuit of said transistor.

4. An indicator to indicate the presence of a flow of cooling air including in combination a lamp bulb, a thermistor spaced therefrom with the influence of heat radiated and convected from said bulb so that cooling air can flow between said thermistor and said bulb, a transistor circuit, said bulb and the resistance of said thermistor being parameters thereof, said circuit further including means responsive to the alteration in the amount of cooling air flowing and to the alteration in the amount of heat radiated and convected to said thermistor to alter the current through said bulb.

5. An indicator to indicate the presence of a flow of cooling air including in combination a lamp bulb, a thermistor spaced therefrom within the influence of heat radiated and convected from said bulb so that cooling air can flow between said thermistor and said bulb, a first transistor in series circuit with said lamp bulb, a second transistor in the base circuit of said first transistor, said thermistor being in the base circuit of said second transistor, whereby alteration in the amount of cooling air flowing and alteration in the amount of heat radiated and convected to said thermistor alters the base current in said second transistor altering the base current in said first transistor and altering the current flow through said bulb.

References Cited by the Examiner

UNITED STATES PATENTS 3,020,760 2/1962 Schnoll ------------- 73—204

NEIL C. READ, *Primary Examiner.*

R. M. ANGUS, *Assistant Examiner.*